United States Patent
Kavesh

(10) Patent No.: US 7,147,807 B2
(45) Date of Patent: Dec. 12, 2006

(54) SOLUTION SPINNING OF UHMW POLY (ALPHA-OLEFIN) WITH RECOVERY AND RECYCLING OF VOLATILE SPINNING SOLVENT

(75) Inventor: Sheldon Kavesh, Whippany, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/028,273

(22) Filed: Jan. 3, 2005

(65) Prior Publication Data

US 2006/0145378 A1 Jul. 6, 2006

(51) Int. Cl.
*D01D 5/04* (2006.01)

(52) U.S. Cl. .............................. 264/37.13; 264/37.14; 264/85; 264/205

(58) Field of Classification Search ............ 264/37.13, 264/37.14, 85, 205
See application file for complete search history.

(56) References Cited

U.S. PATENT DOCUMENTS

| | | | |
|---|---|---|---|
| 3,891,499 A * | 6/1975 | Kato et al. ............... 264/205 X |
| 4,344,908 A | 8/1982 | Smith et al. ................. 264/203 |
| 4,411,854 A | 10/1983 | Maurer et al. .............. 264/205 |
| 4,413,110 A | 11/1983 | Kavesh et al. ........... 526/348.1 |
| 4,422,993 A | 12/1983 | Smith et al. ............. 264/210.8 |
| 4,430,383 A | 2/1984 | Smith et al. ................. 428/364 |
| 4,436,689 A | 3/1984 | Smith et al. ................. 264/204 |
| 4,536,536 A | 8/1985 | Kavesh et al. .............. 524/462 |
| 4,551,296 A | 11/1985 | Kavesh et al. .............. 264/203 |
| 4,584,347 A | 4/1986 | Harpell et al. .............. 525/119 |
| 4,663,101 A | 5/1987 | Kavesh et al. ........... 264/178 F |
| 4,668,717 A | 5/1987 | Lemstra et al. ............. 523/322 |
| 4,784,820 A | 11/1988 | Kavesh ....................... 264/349 |
| 5,240,566 A * | 8/1993 | Hahn et al. .................... 203/35 |
| 5,443,904 A | 8/1995 | Ohta et al. .................. 428/364 |
| 5,547,626 A | 8/1996 | Ohta et al. .................. 264/203 |
| 5,736,244 A | 4/1998 | Kavesh et al. .............. 428/364 |
| 5,741,451 A | 4/1998 | Dunbar et al. .............. 264/103 |
| 5,972,498 A | 10/1999 | Kavesh et al. .............. 428/364 |
| 6,448,359 B1 | 9/2002 | Kavesh ....................... 526/352 |
| 6,605,348 B1 | 8/2003 | Ohta et al. .................. 428/364 |

FOREIGN PATENT DOCUMENTS

| | | |
|---|---|---|
| GB | 2042414 | 9/1980 |
| JP | A-60/52647 | 8/1983 |
| WO | WO 93/12276 | 6/1993 |
| WO | WO-9312276 A1 * | 6/1993 |

OTHER PUBLICATIONS

Smith et al., "Ultrahigh-Strength Polyethylene Filaments by Solution Spinning and Hot Drawing", Poly. Bull, 1, pp. 733-736 (1979).
Förster, H., "Organic Vapors in Air and Nitrogen—Disposal or Recovery of Potentially Valuable Recyclables?", Erdöl Erdgas Kohle 114, No. 4, pp. 211-214 (Apr. 1995).

* cited by examiner

*Primary Examiner*—Leo B. Tentoni
(74) *Attorney, Agent, or Firm*—Virginia Szigeti

(57) ABSTRACT

A process for spinning high molecular weight poly (alph-olefin) filament, particularly ultrahigh molecular weight polyethylene filament, from solution in a volatile spinning solvent with recovery and recycling of the solvent.

17 Claims, 3 Drawing Sheets

SOLUTION SPINNING OF UHMW POLY (ALPHA-OLEFIN) WITH RECOVERY AND RECYCLING OF VOLATILE SPINNING SOLVENT

BACKGROUND OF THE INVENTION

1. Field of the Invention

The invention relates to a process for spinning high molecular weight poly (alpha-olefin) (UHMW PO) filament from solution in a volatile solvent with recovery and recycling of the solvent. More particularly, the invention relates to a process for spinning high molecular weight polyethylene homopolymer or copolymer filament from solution in a volatile solvent with recovery and recycling of the solvent.

2. Description of the Related Art

High strength, high modulus polyethylene and polypropylene filaments have been prepared from ultrahigh molecular weight polymers by solution spinning and drawing. Such filaments have proven extremely useful in ballistic protection, penetration- and cut-resistant applications, composites, ropes and netting among other applications. The first description of solution spinning of strong polyethylene filaments, was by P. Smith, P. J. Lemstra, B. Kalb and A. J. Pennings, *Poly. Bull.*, 1, 731 (1979). Single filaments were spun from 2 wt. % solution in decalin(decahydronaphthalene) at 130° C., quenched to a gel state, and then stretched while evaporating the decalin in a hot air oven at 100 to 140° C.

In the intervening decades since this first description, two principal solution spinning processes have been developed differing in part by whether the spinning solvent is volatile or non-volatile at the spinning temperature. In one solution spinning process, a solution of ultrahigh molecular weight polyethylene (UHMW PE) is prepared at elevated temperature in a first solvent such as a heavy mineral oil that is essentially non-volatile at the spinning temperature. The polymer solution is spun and quenched to a gel state essentially without evaporation of the spinning solvent. The non-volatile spinning solvent is removed from the gel fibers by extraction with a second solvent having a normal boiling point less than 100° C. such as trichlorotrifluoroethane. The gel filaments containing the second solvent are dried to form xerogel filaments. Stretching of the filaments occurs in the gel state containing the first solvent, in the gel state containing the second solvent and in the dry xerogel filament state. Variations of this basic process are described for example in U.S. Pat. Nos. 4,413,110; 4,455,273; 4,536,536; 4,551,296; 4,584,347; 4,663,101; 5,736,244; 5,972,498; and 6,448,359B1.

In this process both the non-volatile spinning solvent and the low boiling second solvent are recovered and recycled, e.g., through sequence tub washing or counter-current flow. Exiting the extraction device are a mixed solvent stream and the gel filament. The gel filament exiting the extraction device is composed of the UHMW PE swollen with the second solvent.

The gel filament containing the low boiling second solvent is passed into one or more drying chambers where the second solvent is evaporated into an air or inert gas stream. Upon leaving the drying chambers, the gas stream containing the second solvent is passed into a solvent recovery unit, e.g., a chemical adsorption, or condensation unit or for non-recovery processes, catalytic oxidation or burning.

The other stream leaving the extraction device consisting of the mixed solvents, i.e., the non-volatile spinning solvent and the low boiling extraction solvent, is passed into a one-stage still where a major portion of the low boiling second solvent is evaporated. The overhead product from the still, consisting of essentially pure second solvent is condensed and recycled to the extraction device. The bottoms product is separated by conventional means into the low boiling second solvent and the non-volatile spinning solvent. The low boiling solvent is then recycled to the extraction device. The non-volatile spinning solvent is recycled to the device in which the UHMW PE solution is formed.

U.S. Pat. No. 5,741,451 describes a method for drawing UHMW PE filaments such as have been prepared by this process. US 2004/0040176 A1 describes an oven and process suitable for simultaneously drawing and drying "lowly oriented polyethylene" filaments containing a solvent, apparently describing the gel filaments containing the extraction solvent. Paragraph [0013] of that application refers to a "gas purification installation" without further description.

The second principal UHMW PE solution spinning process closely follows the disclosure of Smith, Lemstra, Kalb and Pennings cited above. In this process, a solution of UHMW PE is prepared in a solvent, typically decalin, that is volatile at the spinning temperature. The UHMW PE solution is spun at elevated temperature, cooled to form gel filaments, and the spinning solvent is evaporated during cooling and while the filaments are stretched. Variations on this basic process are described, for example, in GB 2,042, 414, U.S. Pat. Nos. 4,411,854; 4,422,993; 4,430,383; 4,436, 689; 5,443,904; 5,547,626; 6,605,348 B1 and JP-A-60/ 5264. However, none of the patents or publications related to this process discusses recovery or recycling of the spinning solvent.

An article titled, "Organische Dämpfe in Luft und Stickstoff-Enstsorrgen oder Wertstoffe zurückgewinnen?" (translated as "Organic Vapors in Air and Nitrogen—Disposal or Recovery of Potentially Valuable Recyclables?"), by H. Forster, *Erdöl Erdgas Kohle,* 114(No. 4), 211–214, 1995, discusses methods for disposal or recovery of solvent vapors in general, without specific reference to filament spinning processes. The methods of choice are differentiated by the concentration of solvent in the gas stream. Disposal by combustion is indicated for solvent contents less than 60 $g/m^3$. Recovery by condensation or membrane concentration followed by condensation is indicated for solvent contents in the range of 100–1500 $g/m^3$. Adsorption is indicated at both low (<20 $g/m^3$) and high (>30 $g/m^3$) solvent contents.

It will be recognized that a process of spinning UHMW PO from a volatile spinning solvent avoids the need for an extraction solvent and the several separation steps that its use entails. However, a need exists for a solution spinning process for UHMW PO using a volatile spinning solvent that recovers and recycles the spinning solvent by simple, economical means.

SUMMARY OF THE INVENTION

The invention is a process for spinning ultrahigh molecular weight poly (alpha-olefin) (UHMW PO), preferably UHMW PE, from solution in a solvent that is volatile at the spinning temperature, with recovery and recycling of that solvent. The process comprises the steps of:

a) forming a solution of an UHMW PO, preferably a homopolymer or copolymer of polyethylene, in a solvent, said UHMW PO having an intrinsic viscosity in decalin at 135° C. of from 5 dl/g to 35 dl/g, said solvent having an atmospheric pressure boiling point of from 125° C. to 250° C.;

b) spinning the solution through a spinneret at a temperature between 115° C. and the atmospheric pressure boiling point of the solvent to form a solution filament;
c) cooling the solution filament to a temperature below the gelation temperature to form a gel filament;
d) evaporating solvent from the gel filament, and optionally from the solution filament, into one or more gas streams to form a dried filament, the evaporation continuing until the solvent concentration in the dried filament is less than 5 percent by weight of UHMW PO plus solvent;
e) stretching at least one of the solution filament, the gel filament and the dried filament to a combined stretch ratio of at least 10:1, wherein at least 2:1 of the combined stretch is of the dried filament;
f) separating at least 90% of the solvent from the gas stream(s);
g) recycling the solvent to the solution forming device; and
h) recycling the gas streams;

wherein at least 95% of the solvent is recycled.

DETAILED DESCRIPTION OF THE INVENTION

Figure 1:
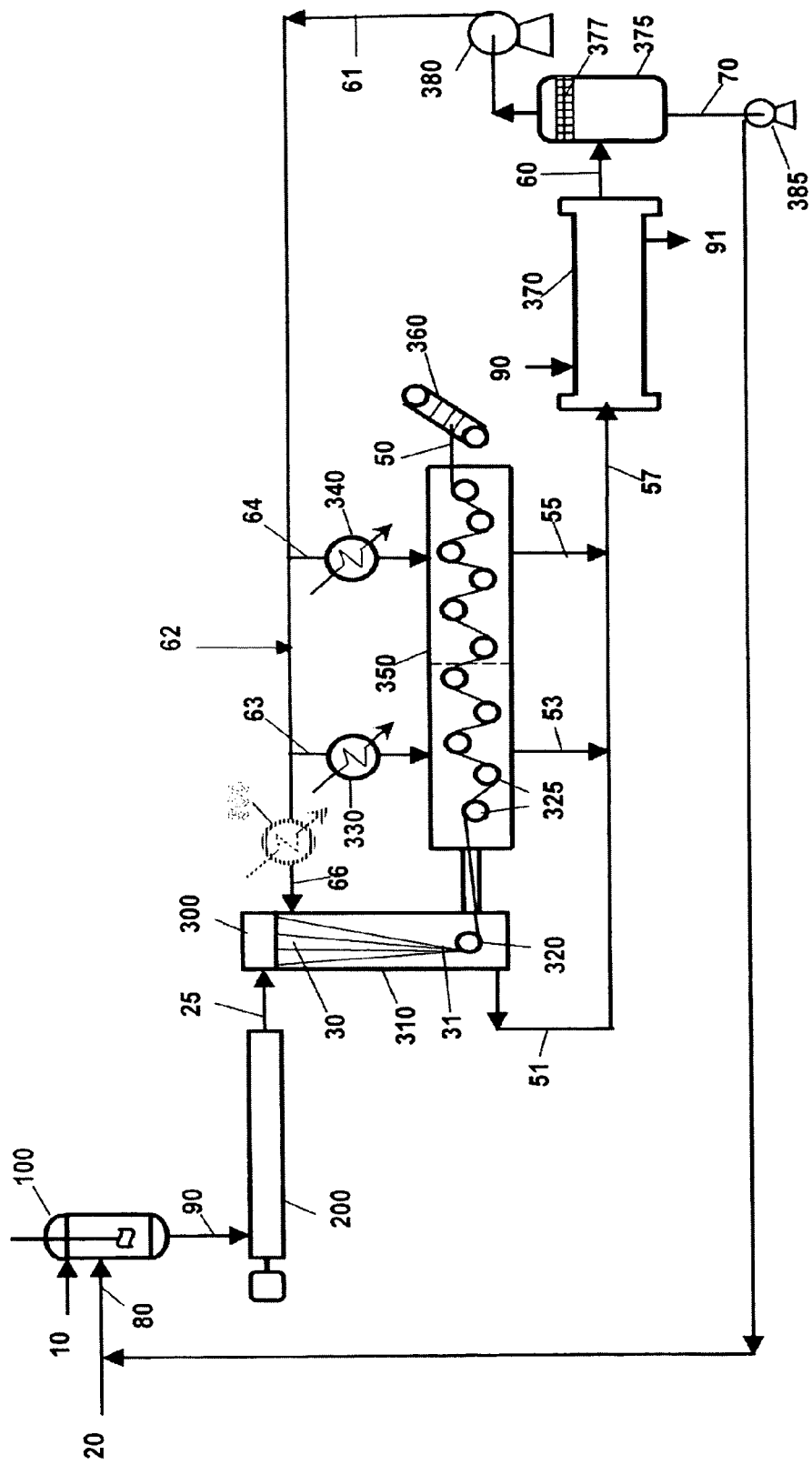
FIG. 1 shows a schematic diagram for one embodiment of the inventive solution spinning process in which a volatile spinning solvent is recovered and recycled.

The invention is a process for spinning UHMW PO, preferably UHMW PE, from solution in a solvent that is volatile at the spinning temperature, with recovery and recycling of that solvent.

UHMW PO for the purposes of this invention is a poly (alpha-olefin) having an intrinsic viscosity in decalin at 135° C. of from 5 dl/g to 35 dl/g. Preferably, the poly (alpha-olefin) is one selected from the group consisting of polyethylene, polypropylene, polybutene-1, poly 4-methyl pentene-1, and their copolymers. Most preferably, the UHMW PO is UHMW PE.

UHMW PE for the purposes of this invention is a polyethylene having an intrinsic viscosity in decalin at 135° C. of from 5 dl/g to 35 dl/g. Preferably the UHMW PE has an intrinsic viscosity of from 9 to 28 dl/g, and most preferably from 12 to 20 dl/g.

Preferably, the UHMW PE is a predominantly linear polyethylene that may contain minor amounts of chain branching or comonomers not exceeding 5 modifying units per 100 main chain carbon atoms, and that may also contain not more than about 25 wt % of one or more polymeric additives such as alkene-1-polymers, in particular low density polyethylene, polypropylene, polybutene-1, poly-4-methylpentene-1, copolymers containing mono-olefins as primary monomers, oxidized polyolefins, graft polyolefin copolymers and polyoxymethylenes, or low molecular weight additives such as antioxidants, lubricants, ultra-violet screening agents, colorants and the like which are commonly incorporated therewith. Yet more preferably, the UHMW PE has fewer than 5 methyl groups per 1000 carbon atoms, still more preferably fewer than 2 methyl groups per 1000 carbon atoms and most preferably, fewer than 0.5 methyl groups per 1000 carbon atoms.

In comparison with a process for spinning UHMW PO from solution in a non-volatile solvent, use of a volatile spinning solvent avoids the need for an extraction solvent and the several separation steps that its use entails. A volatile spinning solvent may be readily dried from the spun UHMW PO filaments. However, a number of constraints exist which must be recognized and addressed.

Among the possible volatile spinning solvents for UHMW PO, many of the most suitable, such as decalin and 1,2 dichlorobenzene, are flammable or combustible materials. However, a flammable or combustible spinning solvent presents a fire and an explosion hazard. Prudence suggests that among the first precautions that should be taken in a spinning process using a volatile and flammable/combustible solvent is the use of inert gas environments for spinning and drying the filaments. Second, since it would be difficult to prevent air from infiltrating into the inert gas, it would also be prudent to prevent the solvent concentration in the inert gas from exceeding the lower explosive limit in air. The lower explosive limit of decalin in air is 0.7 vol. % at 100° C. Finally, to prevent detrimental effects on the environment, the spinning solvent dried from the filaments should not be discharged into the atmosphere.

The combined effects of these constraints is that an UHMW PO spinning process that uses a volatile spinning solvent may involve an inert gas stream containing the solvent at low concentration. The solvent in that gas stream should either be combusted before being discharged to the atmosphere, or the solvent must be recovered from the low concentration gas stream. The aforementioned article by Foster indicates that combustion is the method of choice for solvent concentrations less than 60 g/m$^3$. It may be noted that the lower flammability limit of many solvents, for example decalin in air at 100° C., is 32 g/m$^3$.

Foster also indicates adsorption as a means of solvent recovery from low concentration gas streams. Adsorption in beds of activated carbon have the capability of removing the solvent from a low concentration gas stream but require subsequent steam stripping, condensation, decanting and drying to enable reuse of the solvent. Much of the process simplicity and economy possible in the use of a volatile spinning solvent would be dissipated using adsorption as the primary means of recovery of large volumes of solvent from low concentration gas streams, but may be feasible. Carbon bed adsorption is more feasible as a secondary recovery method when solvent loads are minimal and long adsorber cycle times can be anticipated.

The inventive process provides a method for solution spinning of UHMW PO, especially UHMW PE, using a volatile spinning solvent that recovers and recycles the spinning solvent by simple, economical means.

The inventive process comprises the steps of:
a) forming a solution of a UHMW PO in a solvent, said UHMW PO having an intrinsic viscosity in decalin at 135° C. of from 5 dl/g to 35 dl/g), said solvent having an atmospheric pressure boiling point of from 125° C. to 250° C.;
b) spinning the solution through a spinneret at a temperature between 115° C. and the atmospheric pressure boiling point of the solvent to form a solution filament;
c) cooling the solution filament to a temperature below the gelation temperature to form a gel filament;

d) evaporating solvent from the gel filament, and optionally from the solution filament, into one or more gas streams to form a dried filament, the evaporation continuing until the solvent concentration in the dried filament is less than 5 percent by weight of UHMW PO plus solvent;

e) stretching at least one of the solution filament, the gel filament and the dried filament to a combined stretch ratio of at least 10:1, wherein at least 2:1 of the combined stretch is of the dried filament;

f) separating at least 90% of the solvent from the gas stream(s);

g) recycling the solvent to the solution forming device; and h) recycling the gas streams;

wherein at least 95% of the solvent is recovered.

A volatile solvent for the purposes of this invention is one having an atmospheric boiling point from 125° C. to about 250° C. Preferably the volatile spinning solvent has an atmospheric pressure boiling point from 130° C. to 230° C., more preferably from 150° C. to 230° C. The atmospheric pressure boiling point is that temperature at which the vapor pressure of the solvent is one atmosphere (101 KPa). Preferred spinning solvents are decalin (cis- or trans-decahydronaphthalene or a mixture thereof) having a boiling point of about 189° C.–191° C. and 1,2 dichlorobenzene having a boiling point of about 180° C. Most preferred is decalin.

Preferably the volatile spinning solvent is anhydrous, containing less than 0.008 percent by weight of water at 20° C., more preferably less than 0.004 percent by weight of water at 20° C., and most preferably less than 0.002 percent by weight of water at 20° C.

For purposes of the present invention, a filament is an elongate body the length dimension of which is much greater than the transverse dimensions of width and thickness. Accordingly, "filament" as used herein includes one, or a plurality of filaments, ribbons, strips, and the like having regular or irregular cross-sections in continuous or discontinuous lengths, and may include films. A yarn is an assemblage of continuous or discontinuous filaments.

The solution of the UHMW PE in the spinning solvent may be formed by any suitable method. Methods for forming solutions of UHMW PE in spinning solvents have been described for example in U.S. Pat. Nos. 4,344,908; 4,413,110; 4,668,717, and 4,784,820 hereby incorporated by reference to the extent not incompatible herewith.

A first embodiment of the inventive process is illustrated schematically in FIG. 1. A mixing vessel 100 is fed with UHMW PE powder 10 and a volatile spinning solvent 80. The spinning solvent stream 80 consists of fresh solvent 20 and recycled solvent 70. The mixing vessel 100 is preferably jacketed or internally heated. The temperature in the mixing vessel 100 is preferably from about 20° C. to about 100° C. The UHMW PE powder is dispersed in the spinning solvent and preferably absorbs from about 1 wt % to about 15 wt % of the spinning solvent while in the mixing vessel 100.

The UHMW PE/spinning solvent dispersion 90 is fed into an extruder 200 wherein the UHMW PE is dissolved in the spinning solvent forming a solution 25. Preferably, the extruder is a twin screw extruder. The UHMW PE solution 25 is fed to a gear pump (not shown) and thence to a spin block 300 containing a multi-hole spinneret. The UHMW PE solution is pumped through the spinneret at a temperature preferably from about 110° C. to about 160° C. forming solution filament(s) 30. It will be understood that the process can be used to form one or a plurality of filaments, as desired, but for convenience, will hereafter be referred to as forming a plurality of filaments or a yarn. The solution filaments are cooled within a spinning chimney 310 by means of one or a plurality of inert gas streams 66 (one gas stream illustrated) to a temperature below the gelation temperature of the solution. Gel yarn 31 consisting of the gel filaments is passed into an oven 350 having one or more temperature zones. The yarn is dried, stretched and partially oriented within the oven by passing over and under rolls 325 at increasing speed while contacted by one or more recycled gas streams 63, 64 at elevated temperature. Preferably, the gas streams consist of at least 50 volume percent, and most preferably at least 90 volume percent, of inert gases such as nitrogen and carbon dioxide or their mixture. Preferably, the volumetric flows of the gas streams are sufficient to prevent the concentration of evaporated solvent in a gas stream from being greater that the lower flammability limit of that solvent in air at 100° C. as measured by ASTM E681-94. Preferably, the inert gas pressure in the oven is maintained about 25–250 Pa higher than atmospheric pressure to prevent air and oxygen from infiltrating the oven.

The rate of drying of the gel yarn depends on the oven temperature, the residence time of the yarn in the oven (related to length of the oven and yarn velocity through the oven), and the driving force for mass transfer of solvent from the gel yarn to the gas streams. The lower the concentration of solvent in the recycle gas streams entering the oven, the lower will be the solvent concentration in the dried yarn and/or the higher the yarn capacity. However, the additional benefit of reducing the solvent concentration in the gas streams diminishes as solvent concentrations are reduced. Preferably, the solvent concentration in the gas streams entering the oven is at most 0.4 vol. %, more preferably at most 0.2 vol. %, yet more preferably at most 0.1 vol %, and most preferably at most 0.05 vol. %.

The dried, partially oriented yarn 50 containing no more than 5% by weight of solvent, based on solvent plus UHMW PE, is collected as a wound roll 360 on a winder. The dried partially oriented yarn is fed into another similar oven where the stretching is continued (not shown). Alternatively, the yarn may be passed continuously from a first oven where it is substantially dried into a second oven where the dried yarn is further stretched. Stretching of the yarn continues until the combined stretch ratio of the solution filaments, the gel filaments and the dried filaments is at least 10:1, wherein at least 2:1 of the combined stretch is of the dried filaments. Preferably, stretching of the yarn continues until the combined stretch of the gel filaments and the dried filaments is at least 20:1, wherein at least 2:1 of the combined stretch is of the dried filaments. Most preferably, stretching of the yarn continues until the combined stretch of the gel filaments and the dried filaments is at least 30:1, wherein at least 3:1 of the combined stretch is of the dried filaments.

The gas stream(s) 51 containing the spinning solvent removed from the filaments in the spinning chimney 310, and the gas streams 53, 55 containing the spinning solvent removed in the oven are combined in line 57 and passed into a condenser 370. The condenser may be of tubular coil, or plate and frame design or other suitable design. Preferably, the condenser is of shell and tube design. Preferably, at least 90% of the spinning solvent in the gas streams is separated within the condenser by means of a coolant flow through the condenser 90, 91. Chilled solutions of ethylene glycol in water at temperatures from about −20° C. to about 0° C. are preferred coolants.

The two phase liquid/gas stream 60 leaving the condenser 370 is passed into a "knockout" drum 375 in which the phases are separated by gravity and impingement on an knitted metallic wire mesh entrainment separator 377 such as a DEMISTER® manufactured by Koch-Otto York, Parsippany, N.J. Alternatively, the knockout drum 375 may be replaced with, or augmented by, a cyclone separator or a centrifuge.

The condensed spinning solvent 70 enters a pump 385 and is combined with fresh solvent 20 and recycled to the mixing vessel 100.

The gas stream leaving the knockout drum 375 passes into one or more compressors 380 and may be recycled directly back to the oven 350 via streams, 63, 64 and to the spinning chimney 310 via stream 61, as illustrated in FIG. 1. Optionally, the gas stream leaving the knockout drum 375 may be passed into a secondary solvent separation means consisting of an adsorbent bed (not shown). If an adsorbent is used, it preferably contains activated carbon and adsorbs at least 10%, preferably at least 20%, of the solvent remaining in the gas stream before being recycled to the oven and the spinning chimney. Fresh gas 62 is added to make up for losses. The gas stream recycled back to the oven 350 is first passed through one or more heaters 330, 340. The gas stream(s) recycled back to the spinning chimney 310 is (are) optionally heated or cooled in heat exchanger 500.

Preferably, at least 95% of the total spinning solvent charged to the mixing vessel 100 is recovered and recycled in stream 70. More preferably, at least 97% of the spinning solvent is recovered. Most preferably, at least 99% of the spinning solvent is recovered.

Figure 2:
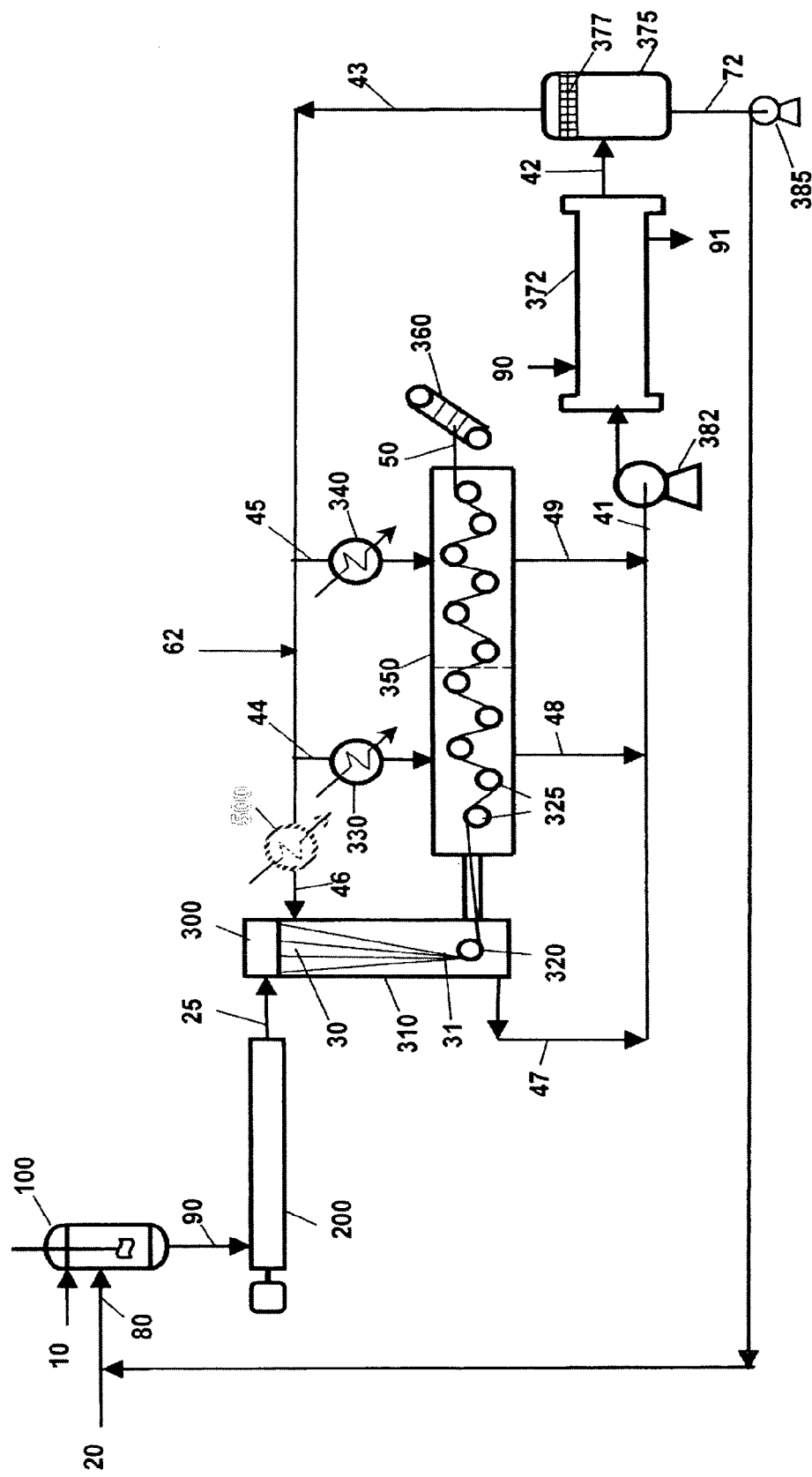
FIG. 2 shows a schematic diagram for a second embodiment of the inventive solution spinning process in which a volatile spinning solvent is recovered and recycled.

A second embodiment of the inventive process, essentially similar to the first embodiment, is illustrated in FIG. 2. In this embodiment the compressor 382 is located immediately before the condenser 372 rather than after the knockout drum 375. This process, in comparison with the first embodiment, trades higher horsepower requirements, operating cost and capital cost of the compressor for higher efficiency of condensation, lower solvent content in the recycled gas and consequently higher drying efficiency.

Figure 3:
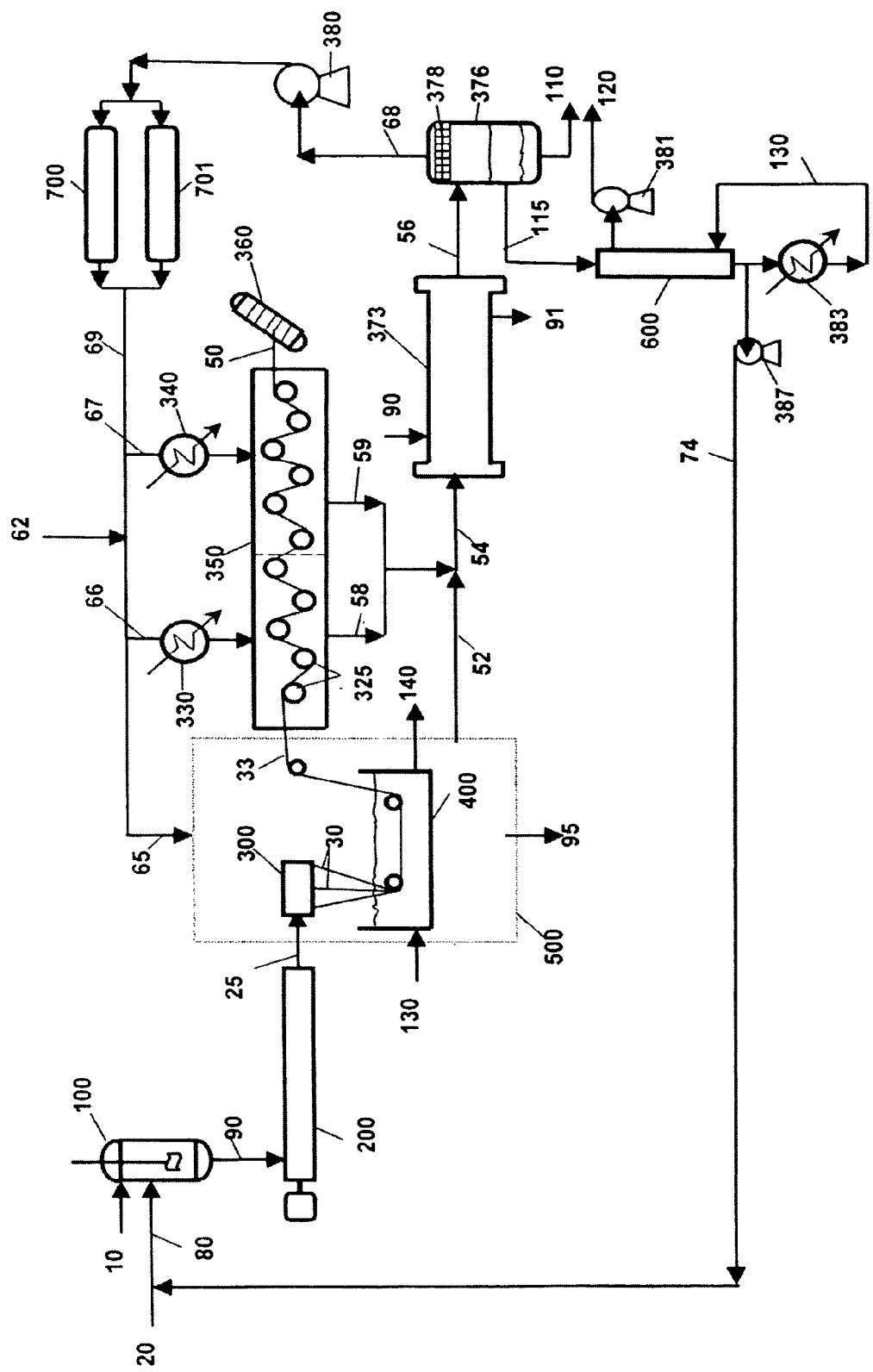
FIG. 3 shows a schematic diagram for a third embodiment of the inventive solution spinning process in which a volatile spinning solvent is recovered and recycled.

In another embodiment illustrated in FIG. 3, solution filaments are prepared in the same manner as in the first and second embodiments above. However, the solution filaments 30 issuing from a multi-hole spinneret in spin block 300 are passed into a water quench bath 400 rather than into a spinning chimney. The temperature in the quench bath 400 is maintained from about 1° C. to about 20° C. by circulation of chilled water 130, 140. The distance from the face of the spinneret to the surface of the water is preferably less than 15 cm, more preferably less than 5 cm, and most preferably less than 2.5 cm. The spin block 300 and the region around the spinning operation are preferably in an enclosure 500 swept by inert gas flow 65, 95.

The gel yarn thus formed 33 is passed into an oven 350 and dried and stretched as described above. The dried, partially oriented yarn 50 containing no more than 5% by weight of solvent based on solvent plus UHMW PE may be collected as a wound roll 360 on a winder for subsequent additional stretching, or it may be continuously passed into a second similar oven (not shown) for additional stretching. As in the first and second embodiments, stretching of the yarn continues until the combined stretch ratio of the solution filaments, the gel filaments and the dried filaments is at least 10:1, wherein at least 2:1 of the combined stretch is of the dried filaments. Preferably, stretching of the yarn continues until the combined stretch of the gel filaments and the dried filaments is at least 20:1 wherein at least 2:1 of the combined stretch is of the dried filaments. Most preferably, stretching of the yarn continues until the combined stretch of the gel filaments and the dried filaments is at least 30:1 wherein at least 3:1 of the combined stretch is of the dried filaments.

The gas stream 52 leaving the spinning enclosure 500 and the gas streams 58, 59 leaving the oven 350 contain the spinning solvent and water carried with the filaments from the quench bath. Preferably, the volumetric flows of the gas streams are sufficient to prevent the concentration of evaporated solvent in a gas stream from being greater that the lower flammability limit of that solvent in air at 100° C. as measured by ASTM E681-94. Preferably, the non-solvent portion of each gas stream consists of at least 50 volume percent, and most preferably at least 90 volume percent of inert gases such as nitrogen and carbon dioxide or their mixture Gas streams 52, 58 and 59 are combined into stream 54 that enters the condenser 373. The spinning solvent and the water are substantially separated from the gas stream in the condenser 373. Preferably, at least 90% of the spinning solvent in the combined gas streams is separated within the condenser by means of a coolant flow through the condenser 90, 91.

The liquid/gas stream 56 leaving the condenser 373 is passed into a "knockout" drum 376 in which the gas and liquid phases are separated by gravity and impingement on a knitted metallic wire mesh entrainment separator 378 such as a DEMISTER® manufactured by Koch-Otto York, Parsippany, N.J. Alternatively, the knockout drum 376 may be replaced with, or augmented by, a cyclone separator or a centrifuge.

The gas stream 68 leaving the knockout drum 376 passes into one or more compressors 380 and may be recycled directly back to the oven 350 and to the spinning enclosure 500. Optionally, the gas stream leaving the knockout drum may be passed into secondary solvent separation means such as an adsorbent bed 700, 701, as illustrated in FIG. 3, preferably containing activated carbon, to adsorb at least 10%, preferably at least 20%, of the solvent remaining in the gas stream before being recycled to the oven and the spinning enclosure 500. Fresh gas 62 is added to make up for losses. The gas stream recycled back to the oven is first passed through one or more heaters 330, 340.

The essentially immiscible solvent and water phases are separated within the knockout drum by gravity settling and decantation. FIG. 3 illustrates decantation where the solvent is decalin. If the solvent is 1,2 dichlorobenzene, it will be understood that the vertical positions of the solvent and aqueous phases are reversed. The water stream 110 leaving the knockout drum 376 is preferably chilled and recycled back to the quench tank 400 (recycle not shown).

The decanted solvent stream 115 leaving the knockout drum 376 contains a small fraction of dissolved water that may nevertheless interfere with the spinning operation if recycled without further drying. The decanted solvent 115 is dried by passage through a stripping column 600 under reduced pressure produced by a vacuum pump 381. Reboiler 383 produces a solvent vapor stream 130 that strips the water from the solvent. The overhead vapors 120 from the stripping column may be condensed and returned to the knockout vessel (not shown).

The dried spinning solvent 74 leaving the bottom of the stripping column is combined with fresh solvent 20 and recycled to the mixing vessel 100.

Preferably at least 95% of the total spinning solvent charged to the mixing vessel is recovered and recycled in stream 74. More preferably at least 97% of the spinning solvent is recycled. Most preferably at least 99% of the spinning solvent is recycled.

EXAMPLES

Example 1

This example is illustrated schematically in FIG. 1. UHMW PE powder having an intrinsic viscosity of 24 dl/g in decalin at 135° C. is charged 10 to a mixing vessel 100 at the rate of 272 lbs/hr (123 Kg/hr) along with 2450 lbs/hr (1112 Kg/hr) of decalin 80. The temperature in the mixing vessel is maintained at 80° C. by means of an external steam jacket and internal heating. The UHMW PE is dispersed in the decalin and absorbs about 5 wt % of decalin.

The dispersion 90 is fed continuously to a twin screw extruder 200, type ZSK119, manufactured by Coperion Werner & Pfleiderer, Ramsey, N.J. A solution of the UHMW PE in the decalin is formed in the extruder. The solution stream issuing from the extruder is divided into three streams (one stream illustrated) and each such stream 25 passes into a gear pump (not shown) on a spin block 300 containing a multi-hole spinneret. An UHMW PE solution is pumped through a spinneret at a temperature of 130° C. forming solution filaments 30. The solution filaments are cooled within a spinning chimney 310 by means of inert gas streams 66 (one gas stream illustrated) to a temperature of about 40° C. to form gel filaments. The inert gas streams entering the spinning chimney are composed of 99+ vol % nitrogen containing about 0.06 vol % decalin. The volumetric flow rate of inert gas is sufficient to maintain the concentration of decalin in the exiting gas streams 52 below 0.7 vol. % (the lower flammability limit in air at 100° C. as determined by ASTM E681-94). The concentration of decalin in the exiting gas stream is monitored by an on-line analytical instrument. The solution filaments are stretched about 10:1 in traversing the spinning chimney.

Gel yarn 31 consisting of the gel filaments is passed into an oven 350 having two temperature zones and a filament path length of 50 meters. The filaments are dried, stretched and partially oriented within the oven by passing over and under rolls 325 at increasing speeds while the filaments are contacted by heated nitrogen streams 63, 64 at 110° C. and 130° C. respectively. The volumetric flow rate of inert gas is sufficient to maintain the concentration of decalin in the exiting gas streams 53, 55 below 0.7 vol. %. The overall stretch ratio of the yarn in the oven is about 4:1. The partially oriented yarn containing about 1 wt % of decalin is wound into a roll 360 on a winder. The dried, partially oriented yarn is later fed from that wound roll into a second oven (not shown) and stretched about 3:1 at a temperature of 140–155° C.

The gas streams 51, 53, 55 issuing from the spinning chimney 310 and the oven 350 are combined (gas stream 57) and fed into a condenser 370. This combined gas stream 57 consists of about 2697 lbs/hr (1224 Kg/hr) of decalin, and about 77,700 lbs/hr (35,300 Kg/hr) of nitrogen at about 115° C. and one atmosphere pressure.

The condenser 370 is of shell and tube design with one tube pass. The carbon steel shell is of 28 inch (71.1 cm) diameter, having baffles with 26% open area, on 6 inch (15 cm) spacings. The tube bundle consists of 712 stainless steel tubes, type 316, each of 0.75 inch (1.905 cm) outside diameter, 0.049 inch (0.124 cm) wall thickness and 8 foot (244 cm) length arranged on a 0.9375 inch (2.3821 cm) pitch.

The gas stream 57 enters the tubes of the condenser 370. A chilled ethylene glycol/water stream 90 at 0° C. flows on the shell side of the condenser at the rate of about 259,000 lbs/hr (118,000 Kg/hr).

The gas/liquid stream 60 leaving the condenser at a temperature of about 10° C. enters a knock-out drum 375 having a diameter of 6 feet (183 cm) in which the gas and liquid phases are separated by gravity and by impingement on an knitted metallic wire mesh entrainment separator 377, DEMISTER® style 709, manufactured by Koch-Otto York, Parsippany, N.J. The separated gas phase leaving the knock-out drum is passed into a compressor 380 at an inlet pressure of 14 psia (96.5 KPa absolute) and is recycled. The recycled gas stream 61 consists of about 249 lbs/hr (113 Kg/hr) of decalin and about 77,700 lbs/hr (35,300 Kg/hr) of nitrogen. The concentration of decalin in the recycled gas stream is about 0.06 vol. %. Additional nitrogen to make up for losses is added at stream 62.

The separated liquid phase 70 leaving the knock-out drum 375 consists of about 2448 lbs/hr (1111 Kg/hr) of decalin and about 0.4 lbs/hr (0.18 Kg/hr) of dissolved nitrogen. About 90.8 wt % of the decalin in gas stream 57 entering the condenser is separated from the gas stream. The condensed decalin 70 is passed into a pump 385 and thence mixed with fresh solvent 20 and returned to the mixing vessel 100.

The solvent recycled in stream 70 is 99+% of the solvent initially fed to the mixing vessel 100.

Example 2

The process of Example 2 is essentially similar to Example 1 except that the knock-out drum 375 illustrated in FIG. 1 is replaced by a centrifuge. The centrifuge makes the same liquid/vapor separation as the knock-out drum in Example 1.

Example 3

This example is illustrated schematically in FIG. 2. UHMW PE powder having an intrinsic of 24 dl/g in decalin at 135° C. is charged 10 to a mixing vessel 100 at the rate of 289 lbs/hr (131 Kg/hr) along with 2600 lbs/hr (1112 Kg/hr) of decalin 80. The process of Example 3 is essentially similar to Example 1 except that the compressor 382 is positioned immediately before the condenser 372 rather than after the knock-out drum. The compressor receives combined gas stream 41, compresses it and delivers it to the condenser 372 at a pressure of 30 psia (207 KPa absolute). Gas stream 41 consists of about 2697 lbs/hr (1224 Kg/hr) of decalin, and about 77,700 lbs/hr (35,300 Kg/hr) of nitrogen at about 115° C. and one atmosphere pressure.

The condenser 372 is of shell and tube design with one tube pass. The carbon steel shell is of 24 inch (61 cm) diameter, having baffles with 25% open area, on 6 inch (15 cm) spacings. The tube bundle consists of 506 stainless steel tubes, type 316, each of 0.75 inch (1.905 cm) outside diameter, 0.049 inch (0.124 cm) wall thickness and 10 foot (254 cm) length arranged on a 0.9375 inch (2.3821 cm) pitch.

The compressed gas stream enters the tubes of the condenser. A chilled ethylene glycol/water stream 90 at 0° C. flows on the shell side of the condenser at the rate of about 259,000 lbs/hr (118,000 Kg/hr).

The gas/liquid stream 42 leaving the condenser at a temperature of about 10° C. enters a knock-out drum 375 having a diameter of 6 feet (183 cm) in which the gas and liquid phases are separated by gravity and by impingement on an knitted metallic wire mesh entrainment separator 377, DEMISTER® style 709, manufactured by Koch-Otto York, Parsippany, N.J. The separated gas phase leaving the knock-out drum 43 is recycled. Additional nitrogen to make up for losses is added at stream 62.

The recycled gas stream 43 consists of about 98 lbs/hr (44.5 Kg/hr) of decalin and about 77,700 lbs/hr (35,300 Kg/hr) of nitrogen. About 96% of the decalin in the gas stream entering the condenser is separated from the gas stream. The concentration of decalin in the recycled gas stream is about 0.03 vol. %. The drying efficiency of the oven is improved as compared to Example 1 by virtue of the lower decalin content of the recycled gas. The decalin content of the wound roll of yarn 360 is about 0.5 wt %.

The separated liquid phase 72 leaving the knock-out drum 375 consists of about 2597 lbs/hr (1180 Kg/hr) of decalin and about 1.0 lb/hr of dissolved nitrogen. About 96 wt. % of the decalin in gas stream 41 entering the condenser is separated from the gas stream. The condensed decalin 72 is passed into a pump 385 and thence mixed with fresh solvent 20 and returned to the mixing vessel 100.

The solvent recycled in stream 72 is 99+% of the solvent initially fed to the mixing vessel.

Example 4

This example is illustrated schematically in FIG. 3. UHMW PE powder having an intrinsic of 24 dl/g in decalin at 135° C. is charged 10 to a mixing vessel 100 at the rate of 297 lbs/hr (135 Kg/hr) along with 2675 lbs/hr (1214 Kg/hr) of decalin 80. Solution filaments are prepared as described in Example 1 above. However, the solution filaments 30 issuing from a multi-hole spinneret are passed into a water quench bath 400 rather than into a spinning chimney. The solution filaments are stretched about 10:1 in passing from the spinneret to the quench bath. The temperature in the quench bath is maintained at about 10° C. by circulation of chilled water 130, 140. The distance from the face of the spinneret to the surface of the water is about 2.5 cm. The spin block 300 and the region around the spinning operation are in an enclosure 500 swept by inert gas flow 65, 95. The gel yarn thus formed 33 is passed into an oven 350 and dried and stretched as described in Example 1 above. The gel yarn 33 carries water entrained from the quench bath into the oven.

The gas streams 52, 58, 59 issuing from the spinning enclosure and the oven are combined 54 and fed into a condenser 373. This combined gas stream 54 consists of about 2697 lbs/hr (1224.4 Kg/hr) of decalin, about 300 lbs/hr of water and about 77,700 lbs/hr (35,300 Kg/hr) of nitrogen at about 115° C. and one atmosphere pressure.

The condenser 373 is of shell and tube design with one tube pass. The carbon steel shell is of 28 inch (71.1 cm) diameter, having baffles with 26% open area, on 6 inch (15 cm) spacings. The tube bundle consists of 712 stainless steel tubes, type 316, each of 0.75 inch (1.905 cm) outside diameter, 0.049 inch (0.124 cm) wall thickness and 8 foot (244 cm) length arranged on a 0.9375 inch (2.3821 cm) pitch.

The gas stream 54 enters the tubes of the condenser. A chilled ethylene glycol/water stream 90 at 0° C. flows on the shell side of the condenser at the rate of about 259,000 lbs/hr (118,000 Kg/hr).

The gas/liquid stream 56 leaving the condenser at a temperature of about 10° C. enters a knock-out drum 376 having a diameter of 6 feet (183 cm) in which the gas and liquid phases are separated by gravity and by impingement on an knitted metallic wire mesh entrainment separator 377, DEMISTER® style 709, manufactured by Koch-Otto York, Parsippany, N.J.

The separated gas phase 68 leaving the knock-out drum 376 consists of about 50 lbs/hr (22.7 Kg/hr) of decalin, 174 lbs/hr (79 Kg/hr) of water vapor and about 77,700 lbs/hr (35,300 Kg/hr) of nitrogen. About 98% of the solvent in the gas stream 54 entering the condenser is separated from the gas stream. The separated gas stream 68 is passed into a compressor 380 at an inlet pressure of 14 psia (96.5 KPa absolute) and thence into one of at least two carbon bed adsorbers 700, 701. The carbon bed adsorbers are connected in parallel. When one adsorber is on-line, at least one other adsorber is being stripped of adsorbed solvent and the adsorbent reactivated (solvent stripping, recovery and adsorbent reactivation not illustrated). The gas stream leaving the adsorber 69 contains about 25 lbs/hr of decalin, 174 lbs/hr (79 Kg/hr) of water vapor and about 77,700 lbs/hr (35,300 Kg/hr) of nitrogen. About half of the solvent remaining in the gas stream after condensation is removed by adsorption. The concentration of decalin in the recycled gas stream 69 is about 0.0065 vol. %. Additional nitrogen to make up for losses is added at stream 62.

The essentially immiscible decalin and water phases are separated within the knockout drum by gravity settling and decantation. The separated liquid phases leaving the knock-out drum 110, 115 consist in total of about 2647 lbs/hr (1202 Kg/hr) of decalin, 126 lbs/hr (57 Kg/hr) of water and about 0.8 lbs/hr (0.36 Kg/hr) of dissolved nitrogen. About 98 wt % of the decalin in gas stream 56 entering the condenser is separated from the gas stream. The water stream 110 leaving the knockout drum 376 is preferably chilled and recycled back to the quench tank 400 (recycle not shown). The decanted decalin 115 leaving the knockout drum contains a small fraction of dissolved and suspended water. The decanted solvent 115 is dried by passage through a stripping column 600 under reduced pressure produced by a vacuum pump 381. Reboiler 383 produces a decalin vapor stream 130 that strips the water from the solvent. The overhead vapors 120 from the stripping column consist essentially of water and about 10 lbs/hr (4.5 Kg/hr) of decalin. The overhead vapors 120 are condensed and recycled to the knock-out drum (condensation and recycle not shown). The dried spinning solvent 74 leaving the bottom of the stripping column is combined with fresh solvent 20 and recycled to the mixing vessel 100.

The decalin recycled in stream 74 is 99+% of the decalin initially fed to the mixing vessel.

Having thus described the invention in rather full detail, it will be understood that such detail need not be strictly adhered to but that further changes and modifications may suggest themselves to one skilled in the art, all falling with the scope of the invention as defined by the subjoined claims.

What is claimed is:

1. A process comprising the steps of:
    a) forming a solution of a UHMW PO in a solvent, said solvent comprising cis-decahydronaphthalene, trans-decahydronaphthalene or mixtures of cis-and trans-decahydronaphthalene, said UHMW PO having an intrinsic viscosity in decalin at 135° C. of from 5 dl/g to 35 dl/g, said solvent having an atmospheric pressure boiling point of from 125° C. to 250° C.;
    b) spinning the solution through a spinneret at a temperature between 115° C. and the atmospheric pressure boiling point of said solvent to form a solution filament;

c) cooling the solution filament to a temperature below the gelation temperature to form a gel filament;

d) evaporating said solvent from the gel filament and optionally from the solution filament into one or more gas streams to form a dried filament, the evaporation continuing until the solvent concentration in the dried filament is less than 5 percent by weight of UHMW PO plus solvent; e) stretching at least one of the solution filament, the gel filament and the dried filament to a combined stretch ratio of at least 10:1, wherein at least 2:1 of the combined stretch is of the dried filament; f) separating at least 90% of said solvent from the gas stream(s) by condensation;

g) recycling said solvent to the solution forming device; and h) recycling the gas streams; wherein at least 95% of said solvent is recycled; wherein the volumetric flows of the gas streams are sufficent to prevent the concentration of the evaporated solvent in a gas stream from from being greater than the lower flammability limit of that solvent in air at 100° C. as measured by ASTM E681-94.

2. The process of claim 1 wherein the UHMW PO is UHMW PE.

3. The process of claim 1 wherein the solvent is further separated from the gas streams by adsorption after condensation, said adsorption separating at least 10% of the solvent remaining in the gas streams after condensation.

4. The process of claim 3 wherein said adsorption separates at least 20% of the solvent remaining in the gas streams after condensation.

5. The process of claim 2 wherein the gas streams consist of at least 50 volume percent of inert gases selected from the group consisting of nitrogen, carbon dioxide and their mixture.

6. The process of claim 2 wherein the gas streams consist of at least 90 volume percent of inert gases selected from the group consisting of nitrogen, carbon dioxide and their mixture.

7. The process of claim 2, wherein the solvent used to form the UHMW PE solution contains less than 0.008 percent by weight of water at 20° C.

8. The process of claim 2, wherein the solvent concentration in the recycled gas streams is at most 0.4 vol. %.

9. The process of claim 2, wherein the solvent concentration in the recycled gas streams is at most 0.2 vol. %.

10. The process of claim 2, wherein the solvent concentration in the recycled gas streams is at most 0.1 vol. %.

11. The process of claim 2, wherein the solvent concentration in the recycled gas streams is at most 0.05 vol. %.

12. A process comprising the steps of:
a) forming a solution of a UHMW PE in a solvent comprising decalin, said UHMW PE having an intrinsic viscosity in decalin at 135° C. of from 5 dl/g to 35 dl/g, said solvent having an atmospheric pressure boiling point of from 125° C. to 250° C.;

b) spinning the solution through a spinneret at a temperature between 115° C. and the atmospheric pressure boiling point of said solvent to form a solution filament;

c) cooling the solution filament to a temperature below the gelation temperature to form a gel filament;

d) evaporating said solvent from the gel filament and optionally from the solution filament into one or more gas streams to form a dried filament, the evaporation continuing until the solvent concentration in the dried filament is less than 5 percent by weight of UHMW PE plus solvent; e) stretching at least one of the solution filament, the gel filament and the dried filament to a combined stretch ratio of at least 10:1, wherein at least 2:1 of the combined stretch is of the dried filament; f) separating at least 90% of said solvent from the gas stream(s) by condensation;

g) recycling said solvent to the solution forming device; and h) recycling the gas streams; wherein at least 95% of said solvent is recycled;

wherein the volumetric flows of the gas streams are sufficient to prevent the concentration of the evaporated solvent in a gas stream from being greater than the lower flammability limit of that solvent in air at 100° C. as measured by ASTM E681-94.

13. The process of claim 12 wherein the solvent is further separated from the gas streams by adsorption after condensation, said adsorption separating at least 10% of the solvent remaining in the gas steams after condensation.

14. The process of claim 13 wherein said adsorption separates at least 20% of the solvent remaining in the gas streams after condensation.

15. The process of claim 12 wherein the gas streams consist of at least 90 volume percent of inert gases selected from the group consisting of nitrogen, carbon dioxide and their mixture.

16. The process of claim 12, wherein said solvent used to form the UHMW PE solution contains less than 0.008 percent by weight of water at 20° C.

17. The process of claim 12, wherein the solvent concentration in the recycled gas streams is at most 0.1 vol. %.

* * * * *